United States Patent Office 2,721,134
Patented Oct. 18, 1955

2,721,134

METHOD OF MAKING IRON POWDER

Hubert Hoff and Wilhelm vor dem Esche, Dortmund, and Heinz Lessing, Essen-Altenessen, Germany, assignors to Westfalenhutte Dortmund Aktiengesellschaft, Dortmund, Germany, a German company No Drawing. Application June 19, 1951,
Serial No. 232,472

Claims priority, application Germany June 20, 1950

2 Claims. (Cl. 75—.5)

This invention relates to the manufacture of sintered iron powder and has for its object, by the employment of a novel starting material, to produce a sintered iron powder which, while at least equal in quality to other known sintered iron powders, possesses the advantage of a considerably lower cost price. By this means the most serious obstacle which, despite their many advantages, has hitherto limited the use of the products of powder metallurgy is removed.

Up to the present time the production of sintered iron powders which, dependent on the purposes for which they are to be used, must have grain sizes up to about 0.4–0.5 mm., has been carried out mechanically or chemically in accordance with different standard processes. One of these processes consists in reducing compact iron to the necessary range of grain sizes in a purely mechanical manner in high-speed beater mills. Other processes utilise iron in the fluid state which is brought by suitable measures into the required finely divided form. This is effected, for example, by causing a thin stream of iron, after granulation by a jet of water under pressure, to impinge on a centrifuging disc provided with beater elements. Alternatively the stream of iron particles may be caused to impinge on a jet of steam or compressed air.

In the chemical process for the production of sintered iron powder, the starting materials are oxidic iron compounds, such as rolling mill sinter, hammer scale, Scandinavian iron ore concentrates and the like, which have to be reduced. When quite pure iron powder, such as the so-called carbonyl iron, is to be produced, iron pentacarbonyl having the formula $Fe(CO)_5$ is used as the starting material.

Without further explanation it will be appreciated that sintered powders produced in this manner are very expensive, mainly due to the costs of processing. In addition, the known manufacturing processes often result in a sintered powder in which the distribution of the grain sizes and the shape of the particles is unsuitable for the pressing operation.

The process according to the present invention makes use of a waste product, namely furnace dust from blast furnace installations, as the starting material for the production of sintered iron powder. In the condition in which it normally occurs this furnace dust contains up to 50% Fe, substantially in the form of magnetic $Fe_3O_4$.

The following table gives an example of a furnace dust composition according to grain size, this being an average obtained from numerous separate tests:

| Grain size: | Deposit, percent |
|---|---|
| Greater than— | |
| 0.5 mm | 0.0 |
| 0.3 mm | 10 |
| 0.2 mm | 15 |
| 0.15 mm | 25 |
| 0.12 mm | 12 |
| 0.10 mm | 13 |
| 0.088 mm | 6 |
| 0.075 mm | 6 |
| Smaller than— | |
| 0.075 mm | 13 |
| Total | 100 |

This grain size distribution is suitable without modification for the manufacture of sinter powder.

The use of furnace dust as the starting material for the production of sintered iron powder has already been proposed per se, but such proposals, according to which the furnace dust is subjected to a reduction treatment and used directly, have not been put into commercial practice apparently for the reason that the sintered powder produced in accordance with these proposals did not satisfy the requirements. The present invention is based on the recognition that special measures have to be taken in order to obtain from the furnace dust a product which can be used as the basis of the sinter powder.

Accordingly, the process according to the invention comprises subjecting the furnace dust being formed to a concentration treatment by which only the comparatively small percentage of iron and iron oxide particles which, as already shown, is suitable for being worked up to sinter powder, is eliminated from the total mixture and only this percentage is then subjected to the reducing process.

The aforesaid concentration may be effected by magnetic separation, conveniently in an alternating current field, and may, if desired, be followed by a wet mechanical treatment in accordance with processes usual in the preparation of dressed ores, for example, on high-speed percussion frames. The concentration process may be repeated one or more times if necessary or desirable. The concentates thus formed with an Fe content of up to more than 70% (97% $Fe_3O_4$) are then subjected to a reducing treatment in the course of an annealing process by hydrogen or other reducing gases, such as the blast furnace gas which is available on the spot, or other reducing agents.

By suitable adjustment of the frequency and of the current intensity, it is possible in this manner to extract from the furnace dust the iron oxide particles not connected with the gangue, namely just those particles having a grain size which is most suitable for the sinter powder. Furnace dust occurs in such qantities that it is possible to take only the serviceable particles by this preparation treatment and discard the remainder. The fact that, as a result of this action, what seems to be in itself an unfavourable proportion of the amount of furnace dust undergoing the treatment is produced as usable sinter powder is not important, because the processes of preparation can be inexpensively operated and the necessary mechanical equipment installed in the customary path of travel of the dust in such manner that no high transport costs are incurred.

One embodiment of the concentrating and reducing process will now be described by way of example, it being understood that instead of the preparation steps described other processes of a similar nature may be employed. For example, the magnetic separation followed by wet preparation can be replaced by repeated magnetic separation with or without intermediate annealing, etc.

A furnace dust of 51.26% Fe content was subjected to magnetic separation in an alternating current field. There was obtained:

| Furnace dust in the condition in which it occurs, percent | | Magnetic concentrate, percent | |
|---|---|---|---|
| Fe | [1] 51.26 | Fe | [2] 70.15 |
| Mn | 2.95 | $SiO_2$ | 0.90 |
| $SiO_2$ | 6.85 | Mn | 0.54 |
| $Al_2O_3$ | 4.25 | $Al_2O_3$ | 0.32 |
| TiO | 1.88 | | |
| CaO | 2.45 | CaO | 0.23 |
| MgO | 1.63 | MgO | 0.45 |
| S | 0.40 | S | 0.13 |
| $CO_2$ | 2.48 | $CO_2$ | 0.20 |
| C | 4.74 | C | 0.42 |
| P | 0.053 | P | 0.022 |
| $K_2O$ | 0.92 | | |
| $Na_2O$ | 0.42 | | |
| | | Alkali | 0.26 |
| | | Zn | 0.18 |
| | | Pb | 0.04 |
| | | Cu | 0.11 |

[1] About 70% $Fe_3O_4$.
[2] About 97% $Fe_3O_4$.

In this example 10 kg. of sinter powder were obtained from 100 kg. of furnace dust, and 70% of this powder had a grain size between 0.12 and 0.3 mm. There were no grains of a size above 0.5 mm. for the reason that these were not even included in the furnace dust. The percentage of fine particles below 0.12 amounted to 30%. The residual furnace dust had in this case an Fe content of 49%.

If it is decided, for example, that the optimum value of grain size, which in the example is 25% with a grain size of 0.15 mm., should be modified by 0.2 and 0.3 mm., this can readily be achieved by varying the frequency and current intensity. The yield in this case is a little less.

By means of a hydrogen reduction at 800° C., for example, the oxidic iron is converted to the metallic form without the granulation of the starting material being modified. All annealing processes are carried out at temperatures below which sintering of the particles can occur and in such manner that the powder character of the material is maintained.

The process described yields results which are at least equal to the sintered iron powders produced in accordance with the known reduction processes; in fact so far as powders produced by mechanical disintegration are concerned they are superior in regard to grain size composition and particle shape, and moreover they can be produced at a fraction of the cost of these known sinter powders.

The pressed particles produced from these powders by the use of pressures of 3–10 t./cm.$^2$ and subsequent sintering in a hydrogen atmosphere at 1050° C. have substantially the same properties as sintered iron products made from the sinter powders produced by the substantially more expensive processes already discussed.

The possibility afforded by the present process of converting a technically waste product in an extremely simple manner and without appreciable cost into a valuable sintered iron powder opens entirely new avenues in the field of powder metallurgy and renders the use of sintered products possible in numerous fields in which they have not hitherto been employed on account of the high price of the sinter powder.

We claim:

1. A process for manufacturing iron powder suitable for sintering from blast furnace flue dust, which consists in magnetically treating blast furnace flue dust containing approximately 50% iron to separate therefrom 10% clean iron and clean iron oxide particles of grain size less than 0.5 mm., and subjecting such particles to a reduction treatment.

2. A process for manufacturing iron powder suitable for sintering from blast furnace flue dust, which consists in magnetically treating the flue dust to separate therefrom clean iron oxide particles of grain size less than 0.5 mm., and subjecting such particles to reduction treatment so that the iron content of the remainder is only slightly lowered and consequently the adaptability for use by the introduction to the blast furnace is not substantially changed.

References Cited in the file of this patent

UNITED STATES PATENTS

| 156,093 | La Rue | Oct. 20, 1874 |
| 1,517,402 | Constant | Dec. 2, 1924 |
| 2,296,522 | Hartley | Sept. 22, 1942 |
| 2,307,064 | Patterson | Jan. 5, 1943 |
| 2,368,489 | Patterson | Jan. 30, 1945 |
| 2,468,586 | Braund | Apr. 26, 1949 |

OTHER REFERENCES

"Concentration of Blast Furnace Flue Dusts," by S. M. Shelton and F. D. Lamb, published in the Iron Age, June 11, 1942, pages 54–59.